2,714,206
Patented July 26, 1955

2,714,206

SIGNAL RELIABILITY INDICATORS

Daniel Blitz, Boston, Mass., assignor to Raytheon Manufacturing Company, Newton, Mass., a corporation of Delaware Application September 12, 1951, Serial No. 246,249

9 Claims. (Cl. 343—14)

The present invention relates to electronic signaling devices and is particularly useful with devices of the echo detection variety such as, for example, radar systems.

In radar systems such as, for example, altimeters of the frequency modulated type wherein echo signals are received from the ground in response to the impingement of transmitted signals thereon, it is often difficult to identify true echo signals from spurious signals due, for example, to bursts of background noise or signals from other sources. This is particularly true where identification of the echo signals must be done by circuitry in order that the echo signals may be used to control a load, such as an indicating meter. Since a false altimeter reading can be extremely disastrous, particularly when said reading is being used as a basis for the navigation of an aircraft, it is of utmost importance that the operator of an aircraft knows whether the reading appearing on the indicating meter of an altimeter represents a true altitude, or whether it is merely indicative of a spurious signal and represents a false altitude reading.

This invention discloses a system whereby the operator of an altimeter may easily and accurately determine whether the altitude reading presented by the indicator meter is a true reading of absolute altitude, or whether the meter indicator is presenting a false reading. Briefly, this is accomplished by superimposing on the transmitted signal an additional identifying signal other than the normal frequency modulation applied to the transmitted signal for determining altitude. In the particular embodiment disclosed herein, the transmitted signal is frequency modulated in a linear fashion with a triangular wave form, and the additional identifying signal is applied as a sinusoidal wave form of a low constant periodicity. The sinusoidal wave form may be, for example, used to amplitude modulate the triangular wave form with a low percentage of modulation, for example, on the order of ten per cent. The resultant output high frequency signal is thus frequency modulated in a linear manner with the rate of change of frequency being varied as a function of the low frequency sinusoidal identifying wave form. If desired, the variation of the rate of change of frequency may be achieved by varying the repetition rate of the triangular wave form in accordance with the identifying sinusoidal wave form. Echo signals reflected from the ground contain the same modulation components as the transmitted wave, and hence when the echo signals are demodulated at the transmitter, for example, by beating against the transmitted signal, the result will be a beat frequency indicative of the altitude, said beat frequency varying in frequency at the frequency of the identifying signal. This is fed to a frequency meter which may be a discriminator, such that the output thereof has a D. C. component proportional to the average beat frequency representative of the altitude, and an A. C. component proportional to the identifying signal wave form. This A. C. component is a modulation component present only on a reflected signal and therefore exists only as a part of a true altitude signal. The D. C. component may then be used to energize an indicator, or other device, said signal being, if desired, suitably filtered by electrical circuits, or by the inertia of the indicating device. The A. C. component is fed to a phase comparator which compares the phase thereof with the phase of the original identifying signal. A proper phase relationship will cause the output of the phase comparator to operate any suitable indicating device, such as a light, thereby indicating the presence of a signal at the frequency meter or discriminator having an identifying wave form thereon which identifies said signal as having its origin at the transmitter of the system. By proper adjustment of the sensitivity of the indicator fed by the output of the phase comparator, the device may be made to indicate the presence of a true signal of sufficient signal-to-noise ratio in the frequency meter, which experience has shown will produce a reliable altitude indication. If the returning signal drops to below the safe minimum degree of reliability required for true readings, then the identifying wave form superimposed on the signal is also masked and the output of the phase comparator will indicate that fact by any desired means, such as lighting a warning light.

Other and further advantages of this invention will be apparent as the description thereof progresses, reference being had to the accompanying drawings, wherein.

Figure 1:
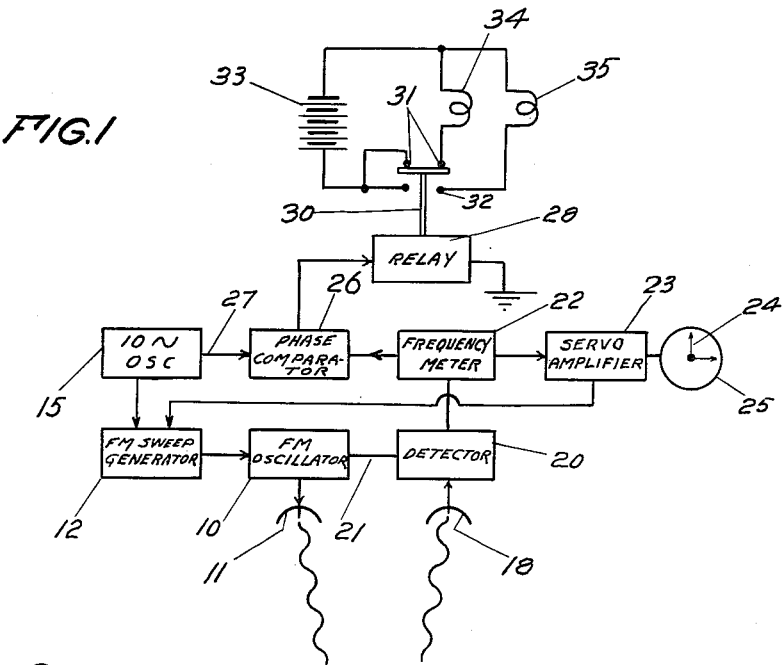
Fig. 1 is a block diagram of a terrain clearance indicator system incorporating the invention.
Figure 3:
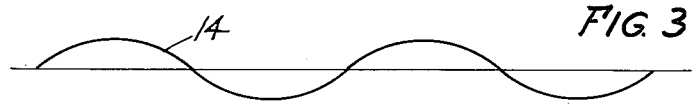
Fig. 3 is a graph of the low frequency sine wave added to the frequency modulating signal by the present invention.
Figure 4:
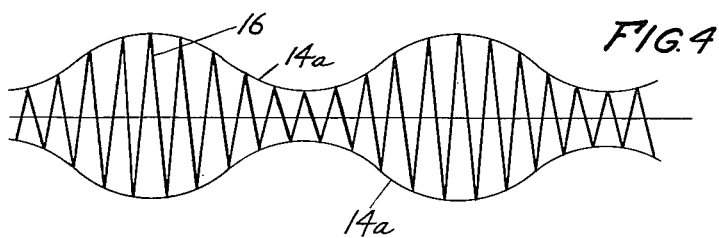
Fig. 4 is a graph of the envelope of the composite modulating wave form in equipment embodying the present invention.

In Fig. 1, the numeral 10 refers to an oscillator incorporating a magnetron, or other source of microwave energy, to be propagated by the transmitting antenna 11. The frequency of the energy generated by oscillator 10, which may be, for example, on the order of 1,000 megacycles per second, is varied with respect to time in a manner determined by a sweep generator 12 that produces a wave of triangular form, as shown by the solid line 13 in Fig. 2. This triangular wave form 13 is modulated by a sine wave of lower frequency, such as ten C. P. S., having the form 14, shown in Fig. 3, which is produced by a generator 15. The resulting transmitted energy is varied in frequency with respect to time in the manner shown by the solid line 16 in Fig. 4 having an envelope 14a, changing the slope of the modulation 16 at a ten cycle rate.

Figure 2:
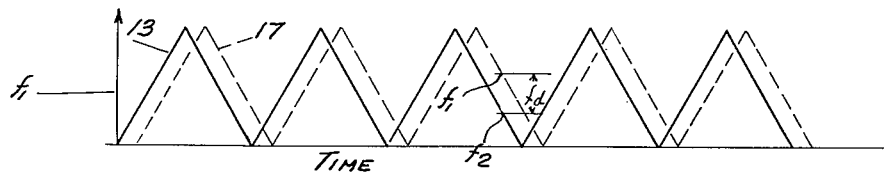
Fig. 2 is a graph of the manner in which the frequency of the transmitted and received energy vary with time in a conventional frequency modulated radar system.

The reflected energy varies in frequency with time in the manner shown by the dotted line 17 in Fig. 2 if the ten C. P. S. modulation is ignored. This reflected energy is received by the receiving antenna 18 and detected in a balanced detector 20, which may be of any convenient type such as the type disclosed in the application for United States patent of Frederick A. Jenks and Norman R. Wild, Serial No. 212,932, filed February 27, 1951. This balanced detector also receives a sample of the transmitter output over line 21 from the oscillator 10.

The output of the balanced detector 20 is the beat frequency $f_a$ between the frequency $f_1$ of the transmitting oscillator 10 at the time the energy was transmitted and the frequency $f_2$ of the same oscillator at the time when reflected energy at the frequency $f_1$ is received. This frequency $f_a$ is proportional to the height of the plane above the terrain and the slope of the modulation 16. The low frequency variation in the slope of modulation 16 causes the beat frequency $f_d$ to be varied in accordance with the low frequency 14 produced by the generator 15. Energy at the beat frequency $f_d$ is applied to a frequency meter 22 of conventional design, or any other convenient device for producing a direct current proportional to the frequency of the beat note.

This direct current is applied to a servo amplifier 23 of any well-known type operated on direct current to turn the pointer 24 on an indicator dial 25 to a position indicative of the height of the point above the terrain and also to vary the amplitude of the modulated triangular wave form 16 generated by the sweep generator 12 in a direction to maintain the average beat frequency $f_d$ constant. As a result the magnitude of the A. C. component present on the D. C. output of the discriminator remains constant regardless of altitude. The direct current contains a ten C. P. S. component resulting from the ten C. P. S. variation in $f_d$, but this modulation is too rapid to affect the indicator.

A portion of the output of the frequency meter 22 is fed into a phase comparator 26, which may be of any convenient type such as the type disclosed within the block 32 of Fig. 2 of the application for United States patent of William R. Mercer, Serial No. 232,603, filed June 20, 1951. A portion of the output of the low frequency generator 15 is also applied to the phase comparator 26 over line 27. If the same low frequency signal appears at the phase comparator from the meter 22, and is in phase with the low frequency signal from the low frequency generator 15, a direct current voltage will appear at the output of the phase comparator 26, as is explained in detail in said application of Mercer.

This voltage at the output of comparator 26 is connected across the coil (not shown) of a relay 28. This relay 28 when energized moves an operator 30 that controls a pair of normally-closed contacts 31 and a pair of normally-open contacts 32 that control the application of voltage from a source 33 to either a warning light 34 that may be red, or to a correct operation indicator light 35 that may be green. The output of the phase comparator 26, instead of being applied to the relay 28, may be applied to any device that will indicate to the pilot that the altitude indicated on the dial 25 is either reliable or unreliable, and which will control any other operation desired.

The invention has been described in connection with its application to a frequency modulated altimeter. However, the principle of the invention may be used wherever a signal is transmitted from and received back at the same point as in frequency or amplitude modulated radar sets of various types where the transmitted energy can be identified by superimposing thereon a characteristic modulation that can be detected upon reception of the transmitted energy after reflection to identify the received energy as that transmitted, and to distinguish it from a spurious signal so that either an operator, or automatic equipment, can be advised whether the signal is to be relied upon.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A signal transmitting and receiving system comprising means for transmitting a radio frequency signal, means for modulating said radio frequency signal with a modulation signal, means for superimposing a signal identifying wave form on said modulation signal, means for receiving and demodulating said radio frequency signal to produce a signal derived from said modulation signal and an identifying signal, and means for comparing said identifying signal with said wave form to produce a voltage when said identifying signal and said identifying wave form coincide in phase and frequency to indicate a true signal.

2. A signal transmitting and receiving system comprising means for transmitting a radio frequency signal, means for frequency modulating said radio frequency signal with a modulation signal, means for superimposing a signal identifying wave form on said modulation signal, means for receiving and demodulating said radio frequency signal to produce a signal derived from said modulation signal and an identifying signal, and means for comparing said identifying signal with said wave form to produce a voltage when said identifying signal and said identifying wave form coincide in phase and frequency to indicate a true signal.

3. A signal transmitting and receiving system comprising means for transmitting a radio frequency signal, means for modulating said radio frequency signal with a modulation signal, means for superimposing a signal identifying wave form on said modulation signal, means for receiving and demodulating said radio frequency signal to produce a signal derived from said modulation signal and an identifying signal, and means comprising a phase comparator for comparing said identifying signal with said wave form to produce a voltage when said identifying signal and said identifying wave form coincide in phase and frequency to indicate a true signal.

4. A signal transmitting and receiving system comprising means for transmitting a radio frequency signal, means for frequency modulating said radio frequency signal with a modulation signal, means for superimposing a signal identifying wave form on said modulation signal, means for receiving and demodulating said radio frequency signal to produce a signal derived from said modulation signal and an identifying signal, and means comprising a phase comparator for comparing said identifying signal with said wave form to produce a voltage when said identifying signal and said identifying wave form coincide in phase and frequency to indicate a true signal.

5. A signal transmitting and receiving system comprising means for transmitting a radio frequency signal, means for linearly frequency modulating said radio frequency signal with a modulation signal, means for superimposing a signal identifying wave form on said modulation signal to cyclically vary the rate of frequency change of said said radio frequency signal as frequency modulated by said modulation signal, means for receiving and demodulating said radio frequency signal to produce a signal derived from said modulation signal and an identifying signal, and means for comparing said identifying signal with said wave form to produce a voltage when said identifying signal and said identifying wave form coincide in phase and frequency to indicate a true signal.

6. A signal transmitting and receiving system comprising means for transmitting a radio frequency signal, means for linearly frequency modulating said radio frequency signal with a modulation signal, means for superimposing a signal identifying wave form on said modulation signal to cyclically vary the rate of frequency change of said radio frequency signal as frequency modulated by said modulation signal, means for receiving and demodulating said radio frequency signal to produce a signal derived from said modulation signal and an identifying signal, and means comprising a phase comparator for comparing said identifying signal with said wave form to produce a voltage when said identifying signal and said identifying wave form coincide in phase and frequency to indicate a true signal.

7. A signal transmitting and receiving system comprising means for transmitting a carrier signal, means for modulating said carrier signal with a modulation signal, means for superimposing a signal identifying wave form on said modulation signal, means for receiving and demodulating said carrier signal to produce a signal derived from said modulation signal and an identifying signal, and means for comparing said identifying signal with said wave form to produce a voltage when said identifying signal and said identifying wave form coincide in phase and frequency to indicate a true signal.

8. A signal transmitting and receiving system comprising means for transmitting a carrier signal, means for frequency modulating said carrier signal with a modulation signal, means for superimposing a signal identifying wave form on said modulation signal, means for receiving and demodulating said carrier signal to produce a signal derived from said modulation signal and an identifying signal, and means for comparing said identifying signal with said wave form to produce a voltage when said identifying signal and said identifying wave form coincide in phase and frequency to indicate a true signal.

9. A signal transmitting and receiving system comprising means for transmitting a carrier signal, means for linearly frequency modulating said carrier signal with a modulation signal, means for superimposing a signal identifying wave form on said modulation signal to cyclically vary the rate of frequency change of said carrier signal as frequency modulated by said modulation signal, means for receiving and demodulating said carrier signal to produce a signal derived from said modulation signal and an identifying signal, and means for comparing said identifying signal with said wave form to produce a voltage when said identifying signal and said identifying wave form coincide in phase and frequency to indicate a true signal.

References Cited in the file of this patent

UNITED STATES PATENTS

| | | |
|---|---|---|
| 2,248,727 | Strobel | July 8, 1941 |
| 2,403,527 | Hershberger | July 9, 1946 |
| 2,422,157 | Wolff | June 10, 1947 |
| 2,423,644 | Evans | July 8, 1947 |
| 2,436,627 | Blitz | Feb. 24, 1948 |
| 2,459,811 | Grieg | Jan. 25, 1949 |
| 2,482,544 | Jacobsen | Sept. 20, 1949 |
| 2,512,330 | Hendrich | June 20, 1950 |
| 2,522,367 | Guanella | Sept. 12, 1950 |